US008653162B2

(12) United States Patent
Albrecht et al.

(10) Patent No.: US 8,653,162 B2
(45) Date of Patent: Feb. 18, 2014

(54) POLYMERIZATION MIXTURE THAT CAN BE PRODUCED WITHOUT WATER

(75) Inventors: Gerhard Albrecht, Prien am Chiemsee (DE); Herbert Hommer, Mühldorf (DE); Thomas Wohlhaupter, Eggstaett (DE)

(73) Assignee: Construction Research & Technology GmbH, Trostberg (DE)

( * ) Notice: Subject to any disclaimer, the term of this patent is extended or adjusted under 35 U.S.C. 154(b) by 369 days.

(21) Appl. No.: 13/132,954

(22) PCT Filed: Nov. 25, 2009

(86) PCT No.: PCT/EP2009/065784
§ 371 (c)(1),
(2), (4) Date: Aug. 3, 2011

(87) PCT Pub. No.: WO2010/076091
PCT Pub. Date: Jul. 8, 2010

(65) Prior Publication Data
US 2011/0294923 A1  Dec. 1, 2011

(30) Foreign Application Priority Data
Dec. 8, 2008  (EP) .................................... 08170959

(51) Int. Cl.
*C04B 24/26*  (2006.01)
(52) U.S. Cl.
USPC ............... 524/5; 524/650; 524/700; 526/312; 526/332; 526/333

(58) Field of Classification Search
USPC ............... 524/5, 650, 700; 526/312, 332, 333
See application file for complete search history.

(56) References Cited

U.S. PATENT DOCUMENTS

| 7,585,927 | B2 | 9/2009 | Liu |
| 2007/0161724 | A1 | 7/2007 | Moraru et al. |
| 2007/0270510 | A1 | 11/2007 | Liu |
| 2009/0163650 | A1 | 6/2009 | Liu |
| 2011/0136944 | A1 | 6/2011 | Bogdan et al. |

FOREIGN PATENT DOCUMENTS

| WO | WO 2005/075529 A2 | 8/2005 |
| WO | WO 2007/126926 A1 | 11/2007 |

OTHER PUBLICATIONS

PCT/EP2009/065784—International Search Report, Nov. 26, 2010.
PCT/EP2009/065784—International Written Opinion, Nov. 26, 2010.
PCT/EP2009/065784—International Preliminary Report on Patentability, Jun. 14, 2011.

*Primary Examiner* — Peter D Mulcahy
(74) *Attorney, Agent, or Firm* — Curatolo Sidoti Co., LPA; Joseph G. Curatolo; Salvatore A. Sidoti

(57) ABSTRACT

The invention relates to a process for the preparation of a polymerization mixture suitable as a dispersant and comprising a copolymer. In the process, a vinyloxyalkylpolyether derivative is reacted with an acid monomer derivative with formation of the copolymer in the presence of a free radical polymerization initiator by free radical polymerization, the free radical polymerization taking place in a medium which contains less than 25% by weight of water and in totality more than 60% by weight of copolymer, vinyloxyalkylpolyether derivative and acid monomer derivative.

20 Claims, No Drawings

POLYMERIZATION MIXTURE THAT CAN BE PRODUCED WITHOUT WATER

CROSS REFERENCE TO RELATED APPLICATIONS

This application is a national stage application of International Application No. PCT/EP2009/065784, filed 25 Nov. 2009, which claims priority from European Patent Application Serial No. 08170959.4, filed 8 Dec. 2008, from which applications priority is claimed, and which are incorporated herein by reference.

The present invention relates to a process for the preparation of a polymerization mixture comprising a copolymer, the polymerization mixture comprising a copolymer and the use thereof.

It is known that admixtures in the form of dispersants are often added to aqueous slurries of powdery inorganic or organic substances, such as clays, silicate powder, chalk, carbon black, crushed rock and hydraulic binders for improving their workability, i.e. kneadability, spreadability, sprayability, pumpability or flowability. Such admixtures are capable of breaking up agglomerates of the solid particles, of dispersing the particles formed and in this way of improving the workability. This effect is also utilized in a targeted manner in the preparation of building material mixtures which contain hydraulic binders, such as cement, lime, gypsum or anhydrite.

In order to convert these building material mixtures based on said binders into a ready-to-use, workable form, as a rule substantially more mixing water is required than would be necessary for the subsequent hydration or hardening process. The proportion of cavities which is formed in the set building material as a result of the excess after evaporation of water leads to significantly poorer mechanical strengths and durabilities.

In order to reduce the excess amount of water at a specified processing consistency and/or to improve the workability at a specified water/binder ratio, admixtures which are generally referred to as water-reducing agents or superplasticizers are used. Agents of this type which are used in practice are in particular copolymers which are prepared by free radical copolymerization of acid monomers with polyether macromonomers).

WO 2005/075529 describes copolymers which, in addition to acid monomer structural units, have vinyloxybutylenepoly(ethylene glycol) structural units as polyether macromonomer structural units. Such copolymers are widely used as high-performance superplasticizers since they have excellent performance characteristics.

The relatively high water content of such an aqueous copolymer solution can, however, result in the following disadvantages in the preparation thereof: the space-time yield is not optimum since water is present as a solvent and not as a reactant. Furthermore, the solvent water gives rise to an additional cost in storage and transport. The removal of the water by suitable drying methods is relatively expensive.

The object of the present invention is therefore to provide an economical process for the preparation of copolymers which have good properties as dispersants, especially as superplasticizers for hydraulic binders.

This object is achieved by a process for the preparation of a polymerization mixture comprising a copolymer, in which a vinyloxyalkylpolyether derivative is reacted with an acid monomer derivative forming the copolymer in the presence of a free radical polymerization initiator by free radical polymerization. The free radical polymerization takes place in a medium which contains less than 25% by weight of water and in total more than 60% by weight of copolymer, vinyloxyalkylpolyether derivative and acid monomer derivative, whereby the molar ratio of acid monomer derivative to vinyloxyalkylpolyether derivative being 20:1 to 1:1 and the vinyloxyalkylpolyether derivative being present according to the general formula (I)

$$H_2C=CH-O-(AO)_a-R^A \qquad (I)$$

where $R^A$ is identical or different and is represented by $-CH_2-C(CH_3)_2-OH$, a linear or branched $C_1$-$C_{12}$ alkyl group, $C_1$-$C_8$ cycloalkyl group, phenyl group or $C_7$-$C_{12}$ arylalkyl group, A is identical or different and is represented by $C_xH_{2x}$ where x=2, 3, 4 and/or 5 and a is identical or different and is represented by an integer from 5 to 350, the molar ratio of the vinyloxyalkylpolyether derivative to the free radical polymerization initiator being 2 to 100 and the vinyloxyalkylpolyether derivative being provided in the form such that 0.1 ppm to 10 000 ppm of a stabilizer which is present as an organic compound and is suitable for inhibiting the oxidative decomposition of alkoxy groups present in polyethers is added to the vinyloxyalkylpolyether derivative and/or the vinyloxyalkylpolyether derivative being depleted of oxygen by stripping with nitrogen.

In the context of the present invention, acid monomer derivatives are present either as acid monomer anhydrides or alternatively as acid monomer esters, but, according to the invention, mixtures thereof may also be used as the acid monomer derivative. The acid monomer derivatives according to the invention are monomers which are capable of free radical copolymerization, have at least one carbon double bond and can be converted by hydrolysis or alkaline saponification into an acid monomer containing at least one acid function. If acid monomer esters (carboxylic esters) are used as the acid monomer derivative, neutral structural units which can be saponified under alkaline conditions (e.g. in concrete) are obtained. Thus, it is only during use that the negative charges required for the effect are released (the ester group which can be eliminated under the alkaline conditions of use then acts virtually as a sort of protective group for the carboxylic acid function). However, acid monomer anhydrides, such as maleic anhydride, hydrolyse as soon as they get into contact with water.

"Depletion of oxygen by stripping with nitrogen" means that the proportion of dissolved oxygen is reduced and the proportion of dissolved nitrogen is increased.

The polymerization mixture obtainable by the process according to the invention and comprising a copolymer is a high-quality dispersant which, owing to the low water content, can be prepared with a high space-time yield. The storage and transport costs are correspondingly low. Furthermore, the polymerization mixture obtainable by the process according to the invention and comprising a copolymer is usually particularly readily soluble in water, i.e. also in aqueous binder systems. The quality of the product obtained by the process is excellent as a dispersant or superplasticizer. In general, it may be said that the process according to the invention produces a quality product in a particularly economical manner.

Preferably the acid monomer derivative used is maleic anhydride (as an acid monomer anhydride), an ester of methacrylic acid, an ester of maleic acid and/or an ester of acrylic acid, preferably maleic anhydride, methyl acrylate, ethyl acrylate, n-butyl acrylate and/or 2-ethylhexyl acrylate. Furthermore n-Propyl acrylate, isopropyl acrylate, methyl methacrylate and/or ethyl methacrylate may be used as the acid monomer derivative.

Usually, the temperature in the medium in which the free radical polymerization takes place is between 40 and 140° C., preferably between 70 and 100° C., during the free radical polymerization.

The free radical polymerization initiator is usually present as an azo compound, as a peroxide, as a persulphate or as hydrazone, azo compounds generally being preferred.

In particular, various azo initiators which each have different decomposition temperatures may be used as the free radical polymerization initiators.

Preferably the free radical polymerization takes place in a medium which contains less than 5% by weight of water and in total more than 80% by weight of copolymer, vinyloxyalkylpolyether derivative and acid monomer derivative.

In a preferred embodiment, in the general formula (I), $R^4$ is present as a methyl group. The corresponding monomer is obtainable by vinylation (addition reaction with acetylene) of methylpolyethylene glycol.

In a further preferred embodiment, in the general formula (I), $R^4$ is present as $-CH_2-C(CH_3)_2-OH$. The corresponding monomer can be economically obtained by terminating the alkoxylation of ether macronionomers with isobutylene oxide.

In the general formula (I), in $C_xH_{2x}$, x is often represented by 2—i.e. a vinyloxyethylpolyether derivative is frequently used.

In the general formula (I), a is preferably represented by an integer from 8 to 200.

Preferably, a chain-transfer agent, which is preferably present as a mercapto compound, is used.

Preferably, the medium in which the free radical polymerization takes place contains less than 3% by weight, preferably less than 1% by weight, of water. It would be optimum to work in the absolutely anhydrous state but the drying of the corresponding starting components associated therewith would be very expensive.

Frequently, the vinyloxyalkylpolyether derivative used is provided in the form such that 1 ppm to 1000 ppm of a stabilizer which is present as an organic compound and is suitable for inhibiting the oxidative decomposition of alkoxy groups present in polyethers is added to the vinyloxyalkylpolyether derivative.

Suitable stabilizers (for inhibiting the oxidative decomposition of alkoxy groups present in polyethers) are frequently selected from diphenylamine derivatives, such as diphenylamine as such, polymeric trimethyldihydroquinoline, alkylated monophenols, such as 2,6-di-tert-butyl-4-methylphenol, alkylated hydroquinones, such as 2,6-di-tert-butyl-4-methoxyphenol, alkylidenebisphenols, such as 2,2"-methylenebis(6-tert-butyl-4-methylphenol), phenolic benzyl compounds, such as 1,3,5-tri(3,5-di-tert-butyl-4-hydroxybenzyl)-2,4,6-trimethylbenzene, thioethers, such as 2,2"-thiobis(6-tert-butyl-4-methylphenol), or amines, such as phenothiazine. Hydroquinone monomethyl ether, butylhydroxytoluene (BHT), butylhydr oxyanisole (BHA) and 2,6-di-tert-butylphenol (Kerobit® TP 26) and N,N'-di-sec-butyl-p-phenyldiamine (Kerobit® BPD; Kerobit® from BASF SE) have proved particularly useful in practice.

The depletion of dissolved oxygen with dissolved nitrogen is effected as a rule by passing nitrogen into the corresponding oxygen-containing liquid so that the oxygen present is displaced by nitrogen (stripping). The depletion of oxygen by stripping with nitrogen results in a suppression of the oxidative decomposition of alkoxy groups present in polyethers.

Frequently, the vinyloxyalkylpolyether derivative used is enriched with dissolved nitrogen by stripping in such a way that the vinyloxyalkylpolyether derivative used comprises dissolved nitrogen to dissolved oxygen in a molar ratio greater than 10, preferably greater than 30.

The invention furthermore relates to a polymerization mixture comprising a copolymer which is preparable by the process described above.

The invention also relates to the use of the polymerization mixture comprising a copolymer as a superplasticizer for hydraulic binders, in particular for cement or gypsum, and/or as a superplasticizer for latently hydraulic binders. The polymerization mixture comprising a copolymer can also be used, for example, as an additive for cement production (grinding aid and "water reducer" for pure Portland cements or composite cements).

Below, the invention is illustrated in more detail with reference to working examples.

SYNTHESIS EXAMPLE 1

In a storage container 1, first 30.5 g (0.31 mol) of maleic anhydride is dissolved in 140 g (0.28 mol) of methylpolyethylene glycol-500 monovinyl ether. 25 g (about 15% by mass) of this monomer mixture is initially introduced into a heatable reaction vessel equipped with thermometer, stirrer, reflux condenser and two connections for separate feeds and heated to 85° C. The reactor together with the monomer mixture is provided with an inert atmosphere by bubbling in nitrogen via a bottom valve and the inert atmosphere is maintained over the entire reaction time. The remaining monomer solution from storage container 1 is now fed in in the course of 1.5 h. At the same time, a solution of 4.0 g of azodibutyronitrile in 25 ml of acetone (initiator solution) is metered in from a separate storage container 2 in the course of 2 h. The reaction mixture turns increasingly brownish in the course of the polymerization and becomes slightly viscous. After the end of the addition of the initiator solution, stirring is continued for 1 h at 90° C.

Thereafter, the reflux condenser is replaced by a water separator and the acetone present in the reaction mixture is discharged. The dark brown crude product is cooled to 50° C. and diluted by addition of 170 g of water. After neutralization with 21.5 g of an aqueous sodium hydroxide solution (50 weight %), a brown polymer solution having a pH of 6.5 and a solids content of 48.9% by weight is obtained. The weight average molecular weight, which is determined by gel permeation chromatography using polyethylene glycol as standard, is 14 000 g/mol.

SYNTHESIS EXAMPLE 2

150 g (0.15 mol) of methylpolyethylene glycol-1000 monovinyl ether which contains 300 ppm of butylhydroxytoluene (BHT) is introduced into a heated reaction vessel equipped with thermometer, stirrer and a heatable dropping funnel and heated to 90° C. The reactor is provided with an inert atmosphere during the heat-up phase by bubbling in nitrogen via a bottom valve. 15.7 g (0.16 mol) of maleic anhydride is added dropwise via a heated dropping funnel in the course of 1.5 h, while altogether 3.6 g of azodibutyronitrile, divided into equal portions of 0.6 g each, are added every 15 minutes as solid. The reaction mixture turns increasingly brownish in the course of the polymerization and becomes slightly viscous. After the end of the addition of the initiator, stirring is continued for 1 h at 90° C. Thereafter, the dark brown crude product is cooled to 50° C. and diluted by addition of 300 g of water. After neutralization with 11.2 g of an aqueous 50% strength sodium hydroxide solution, a polymer solution having a pH of 6.4 and a solids content of 35.3% by weight is obtained. The weight average molecular weight, which is determined by gel permeation chromatography using polyethylene glycol as standard, is 30 900 g/mol.

Comparative mortar test to Synthesis Example 2:

Below, a mortar test is described in which the product of the process (copolymer solution) from Synthesis Example 2 is compared with an analogous product prepared by aqueous polymerization with respect to the effect. The comparative product (an aqueous copolymer solution) was prepared according to WO 2005/075529 by free radical polymerization in an aqueous medium. The following mixture was chosen as a standard guide formulation:

| Portland cement CEM II B/S | 270.00 g |
|---|---|
| Standard sand (0-2 mm, EN 196-1) | 675.00 g |
| Dispersant according to example | 0.54 g (=0.20% by mass of solid, based on cement) |
| Mixing water | as required |

The mortar mixes were prepared according to DIN EN 196-1, paragraph 6.3. In order to evaluate the flow behaviour, the slump of the mortar was measured after 15 strokes on the jolting table.

| Superplasticizer | Slump in cm after | |
|---|---|---|
| | 5 min. | 40 min |
| Product according to WO 2005/075529 | 22.5 | 20.4 |
| Product according to Synthesis Example 2 | 22.9 | 20.6 |

The table shows that, with regard to slump, the products compared perform comparably and in each case meet the requirements of a high-quality high-performance superplasticizer.

SYNTHESIS EXAMPLE 3

According to Synthesis Example 1, first 30.5 g (0.31 mol) of maleic anhydride is dissolved in 140 g (0.28 mol) of methylpolyethylene glycol-500 monovinyl ether in a storage container 1. 12.1 g (0.14 mol) of methyl acrylate are introduced into a separate storage container 2. In each case 10% by mass of both the maleic acid-vinyl ether mixture and the methyl acrylate are pumped into a heatable reaction vessel equipped with thermometer, stirrer, reflux condenser and two connections for separate feeds and are heated to 85° C. The reactor is provided with an inert atmosphere during the heat-up phase by bubbling in nitrogen via a bottom valve. The remainder of the monomers present in storage containers 1 and 2 is metered via the two feeds simultaneously with a constant volume flow rate in the course of 1.5 h. Altogether, 4.0 g of azodibutyronitrile, divided into equal portions, are added every 15 minutes as solid. The reaction mixture turns brownish. After the end of the addition of the initiator, stirring is continued for 1 h at 85° C. Thereafter, the dark brown crude product is cooled to 40° C. and diluted by addition of 320 g of water. After neutralization with 54.0 g of an aqueous 20% strength sodium hydroxide solution, a dark brown polymer solution having a pH of 6.6 and a solids content of 35% by weight is obtained. The weight average molecular weight, which is determined by gel permeation chromatography using polyethylene glycol as a standard, is 15 500 g/mol.

SYNTHESIS EXAMPLE 4

According to Synthesis Example 2, 150 g (0.15 mol) of methylpolyethylene glycol-1000 monovinyl ether, which contains 300 ppm of butylhydroxytoluene (BHT) as an antioxidant, is introduced into a heated reactor at 80° C. The monomer mixture and the reactor are provided with an inert atmosphere by bubbling in nitrogen via a bottom valve. Thereafter, 7.45 g of azo initiator, dissolved in 30 ml of toluene, are metered in via the feed A in the course of 75 min. Simultaneously 7.45 g (0.45 mol) of ethyl acrylate is added via the feed B in the course of 60 min. After the end of the initiator addition, the yellow-brown polymerization mixture is stirred for a further 45 min at 80° C. The crude product is then cooled to 40° C. and diluted with 150 ml of water. A polymer solution of light brown colour having a solids content of 46 weight % results. The weight average molecular weight, which is determined by gel permeation chromatography using polyethylene glycol as standard, is 35 000 g/mol.

SYNTHESIS EXAMPLE 5

According to Synthesis Example 2, 100 g (0.08 mol) of α-vinyloxy-ω-(2-methylpropan-2-ol)-poly(oxy-1,2-ethanediyl), having an average molecular weight of 1200 g/mol and stabilized with 300 ppm of Kerobit® TP 26, is introduced at 80° C. into a heated reactor. 5.6 g of 2,2"-azobis (2,4-dimethylvaleronitrile), dissolved in 15 ml of toluene (initiator solution), are added via a feed A in the course of 60 min. Simultaneously therewith, 16.8 g (0.16 mol) of ethyl acrylate are metered in via the feed B in the course of 60 min.

After the end of the addition of initiator solution, stirring is continued for 1 h at 90° C. After cooling to room temperature, 117 g of copolymer are obtained in the form of a light orange, viscous liquid. The weight average molecular weight, which is determined by gel permeation chromatography using polyethylene glycol as a standard, is 24 500 g/mol.

The products of Synthesis Examples 1 to 5 are in each case high-quality dispersants or superplasticizers for hydraulic binders.

The invention claimed is:

1. Process for the preparation of a polymerization mixture comprising a copolymer, in which a vinyloxyalkylpolyether derivative is reacted with an acid monomer derivative with formation of the copolymer in the presence of a free radical polymerization initiator by free radical polymerization, the free radical polymerization taking place in a medium which contains less than 25% by weight of water and in totality more than 60% by weight of copolymer, vinyloxyalkylpolyether derivative and acid monomer derivative, the molar ratio of acid monomer derivative used to vinyloxyalkylpolyether derivative used being 20:1 to 1:1; the acid monomer derivative being capable of free radical polymerization having at least one carbon double bond and capable of conversion by hydrolysis or alkaline saponification into an acid monomer containing at least one acid function; and the vinyloxyalkylpolyether derivative being present according to the general formula (I)

$$H_2C=CH-O-(AO)_a-R^4 \qquad (I)$$

where $R^4$ is identical or different and is represented by $-CH_2-C(CH_3)_2-OH$, a linear $C_1$-$C_{12}$ alkyl group or branched $C_3$-$C_{12}$ alkyl group, $C_5$-$C_8$ cycloalkyl group, phenyl group or $C_7$-$C_{12}$ arylalkyl group, A is identical or different and is represented by $C_xH_{2x}$ where x=2, 3, 4 and/or 5 and a is identical or different and is represented by an integer from 5 to 350, the molar ratio of the vinyloxyalkylpolyether derivative used to the free radical polymerization initiator used being 2 to 100 and the vinyloxyalkylpolyether derivative used being provided in the form such that 0.1 ppm to 10 000 ppm of a stabilizer which is present as an organic compound and is suitable for inhibiting the oxidative decomposition of alkoxy groups present in polyethers is added to the vinyloxyalkylpolyether derivative used and/or the vinyloxyalkylpolyether derivative used being enriched with dissolved nitrogen with depletion of dissolved oxygen.

2. Process according to claim 1, wherein the acid monomer derivative used is maleic anhydride, an ester of methacrylic acid, an ester of maleic acid and/or an ester of acrylic acid.

3. Process according to claim 1, wherein the temperature in the medium in which the free radical polymerization takes place is between 40 and 140° C. during the free radical polymerization.

4. Process according to claim 1, wherein the free radical polymerization initiator is present as an azo compound, as a peroxide, as a persulphate or as hydrazone.

5. Process according to claim 4, wherein various azo initiators which each have different decomposition temperatures are used as the free radical polymerization initiator.

6. Process according to claim 1, wherein the free radical polymerization takes place in a medium which contains less than 5% by weight of water and in totality more than 80% by weight of copolymer, vinyloxyalkylpolyether derivative and acid monomer derivative.

7. Process according to claim 1, wherein, in the general formula (I), $R^4$ is present as a methyl group.

8. Process according to claim 1, wherein, in the general formula (I), $R^4$ is present as —$CH_2$—$C(CH_3)_2$—OH.

9. Process according to claim 1, wherein, in the general formula (I), A is identical or different and is represented by $C_xH_{2x}$ where x=2.

10. Process according to claim 1, wherein, in the general formula (I), a is identical or different and is represented by an integer from 8 to 200.

11. Process according to claim 1, wherein further vinylic compounds are used as a comonomer.

12. Process according to claim 1, wherein a chain-transfer agent is used.

13. Process according to claim 1, wherein the medium in which the free radical polymerization takes place has less than 3% by weight, optionally less than 1% by weight, of water.

14. Polymerization mixture comprising a copolymer and prepared by the process according to claim 1.

15. Process comprising adding the polymerization mixture comprising the copolymer, according to claim 14, as a superplasticizer to an aqueous slurry of hydraulic binder, and/or as a superplasticizer to an aqueous slurry of latently hydraulic binder.

16. Process according to claim 15, wherein the hydraulic binder is cement or gypsum.

17. Process according to claim 1, wherein the acid monomer derivative used is maleic anhydride, methyl acrylate, ethyl acrylate, n-butyl acrylate and/or 2-ethylhexyl acrylate.

18. Process according to claim 1, wherein the temperature in the medium in which the free radical polymerization takes place is between 70° C. and 100° C. during the free radical polymerization.

19. Process according to claim 1, wherein the free radical polymerization initiator comprises an azo compound.

20. Process according to claim 12, wherein the chain-transfer agent comprises a mercapto compound.

* * * * *